United States Patent
Baller et al.

(10) Patent No.: US 7,254,601 B2
(45) Date of Patent: Aug. 7, 2007

(54) METHOD AND APPARATUS FOR MANAGING INTELLIGENT ASSETS IN A DISTRIBUTED ENVIRONMENT

(75) Inventors: Eric Henry Baller, Webster, NY (US); John Thomas Canosa, Spencerport, NY (US); John Maitland Cook, III, Webster, NY (US); David Patrick Hart, Webster, NY (US); Christopher James Kuntz, Penfield, NY (US); John Louis Taylor, Webster, NY (US); Dimitrios Psarros, Rochester, NY (US); Rajeev Raman, Cupertino, CA (US); Thomas Chiarella, Redwood City, CA (US)

(73) Assignee: Questra Corporation, Redwood City, CA (US)

( * ) Notice: Subject to any disclaimer, the term of this patent is extended or adjusted under 35 U.S.C. 154(b) by 104 days.

(21) Appl. No.: 10/028,126

(22) Filed: Dec. 20, 2001

(65) Prior Publication Data

US 2003/0118353 A1 Jun. 26, 2003

(51) Int. Cl.
*G06F 15/16* (2006.01)
(52) U.S. Cl. ........................ 709/200; 709/223
(58) Field of Classification Search ........... 709/223, 709/224, 228, 200–202, 217–222, 225–227, 709/206, 207; 715/513; 358/1.15; 399/8, 399/9, 10, 11, 12; 714/44, 46, 47, 48, 25
See application file for complete search history.

(56) References Cited

U.S. PATENT DOCUMENTS

| | | | |
|---|---|---|---|
| 4,497,037 A | | 1/1985 | Kato et al. |
| 4,583,834 A | | 4/1986 | Seko et al. |
| 5,077,582 A | | 12/1991 | Kravette |
| 5,184,179 A | | 2/1993 | Tarr et al. |
| 5,530,899 A | * | 6/1996 | MacDonald .................. 710/17 |
| 5,579,087 A | * | 11/1996 | Salgado ......................... 399/8 |
| 5,715,496 A | * | 2/1998 | Sawada et al. ................. 399/8 |
| 5,727,248 A | * | 3/1998 | Ogura ............................. 399/8 |
| 5,732,212 A | | 3/1998 | Perholtz et al. |
| 5,845,061 A | * | 12/1998 | Miyamoto et al. ............. 714/4 |
| 5,887,216 A | * | 3/1999 | Motoyama ..................... 399/8 |
| 5,890,029 A | * | 3/1999 | Hirata et al. .................... 399/8 |
| 5,974,234 A | * | 10/1999 | Levine et al. ............... 358/1.16 |
| 6,003,070 A | * | 12/1999 | Frantz ........................ 709/206 |

(Continued)

*Primary Examiner*—Moustafa Meky
(74) *Attorney, Agent, or Firm*—Workman Nydegger (57) ABSTRACT

A method is described which provides for managing intelligent equipment that is deployed remotely. The capabilities of managing such distributed assets include both infrastructural capabilities to establish and maintain connection through a variety of wired and wireless mechanisms and application modules that provide distributed asset management capabilities.

27 Claims, 6 Drawing Sheets

U.S. PATENT DOCUMENTS

| | | | |
|---|---|---|---|
| 6,041,041 A | 3/2000 | Ramanathan et al. | |
| 6,161,145 A | 12/2000 | Bainbridge | |
| 6,205,466 B1 | 3/2001 | Karp et al. | |
| 6,226,650 B1 | 5/2001 | Mahajan et al. | |
| 6,256,378 B1 | 7/2001 | Iggulden et al. | |
| 6,298,457 B1 | 10/2001 | Rachlin et al. | |
| 6,304,895 B1 | 10/2001 | Schneider et al. | |
| 6,317,570 B1* | 11/2001 | Uchida et al. | 399/8 |
| 6,317,848 B1 | 11/2001 | Sorens et al. | |
| 6,366,741 B1* | 4/2002 | Fukushima | 399/8 |
| 6,415,392 B1* | 7/2002 | Suzuki et al. | 714/27 |
| 6,430,711 B1* | 8/2002 | Sekizawa | 714/47 |
| 6,453,127 B2* | 9/2002 | Wood et al. | 399/8 |
| 6,453,129 B1* | 9/2002 | Simpson et al. | 399/8 |
| 6,493,517 B1* | 12/2002 | Hanson | 399/11 |
| 6,553,336 B1* | 4/2003 | Johnson et al. | 702/188 |
| 6,665,425 B1* | 12/2003 | Sampath et al. | 54/27 |
| 6,681,344 B1* | 1/2004 | Andrew | 714/38 |
| 6,687,848 B1* | 2/2004 | Najmi | 714/4 |
| 6,754,664 B1* | 6/2004 | Bush | 707/102 |
| 6,782,542 B1* | 8/2004 | Mein et al. | 719/330 |
| 6,832,239 B1* | 12/2004 | Kraft et al. | 709/203 |
| 6,925,335 B2* | 8/2005 | May et al. | 700/9 |
| 2001/0027439 A1* | 10/2001 | Holtzman et al. | 705/39 |
| 2001/0052999 A1* | 12/2001 | Hiraoka | 358/1.15 |
| 2002/0035533 A1* | 3/2002 | Mache et al. | 705/37 |
| 2002/0059489 A1* | 5/2002 | Davis et al. | 710/72 |
| 2002/0080391 A1* | 6/2002 | Sugiura et al. | 358/1.15 |
| 2002/0133753 A1* | 9/2002 | Mayberry et al. | 714/38 |
| 2002/0135801 A1* | 9/2002 | Tessman et al. | 358/1.15 |
| 2003/0025931 A1* | 2/2003 | Dorfman et al. | 358/1.15 |
| 2003/0063309 A1* | 4/2003 | Parry | 358/1.15 |
| 2003/0072027 A1* | 4/2003 | Haines et al. | 358/1.15 |
| 2003/0229529 A1* | 12/2003 | Mui et al. | 705/8 |
| 2004/0098515 A1* | 5/2004 | Rezvani et al. | 709/400 |
| 2004/0221026 A1* | 11/2004 | Dorland | 709/223 |
| 2005/0102388 A1* | 5/2005 | Tabbara et al. | 709/223 |
| 2006/0282521 A1* | 12/2006 | Anderson et al. | 709/223 |

* cited by examiner

```
<SOAP-ENV:Envelope   520
  xmlns:SOAP-ENV=http://schemas.xmlsoap.org/soap/envelope/
  xmlns:xsd=http://www.w3.org/1999/XMLSchema/
  xmlns:xsi="http://www.w3.org/1999/XMLSchema/instance/">

<SOAP-ENV:Header>   530
  <RequestHeader>   540
    <Operation>getProperties</Operation>
    <ServiceName>RemoteControlManagement</ServiceName>
    <SecurityContext>
      <AuthenticationToken>NTk1NDkTE2A6LTdmZIwMTA=</AuthenticationToken>
    </SecurityContext>
  </RequestHeader>
</SOAP-ENV:Header>

<SOAP-ENV:Body>   550
  <getProperties>   560
    <MemberId>a2bdevice2</MemberId>
    <WebServiceType>RemoteDiagnostics</WebServiceType>
    <PropertyNames>
      <Property name="Fan_Speed_1"></Property>
    </PropertyNames>
  </getProperties>
</SOAP-ENV:Body>

</SOAP-ENV:Envelope>
```

Figure 5a: SOAP-Encoded Data

```
getProperties.MemberId=a2bdevice2&getProperties.WebServiceType=RemoteDiagn
ostics&getProperties.PropertyNames.Property@name=Fan%20Speed%201
```

Figure 5b: URL-Encoded Data

```
g.M=a2bdevice2&g.W=RemoteDiagnostics&g.P.P@n=Fan%20Speed%201
```

Figure 5c: Compact-URL encoded data

METHOD AND APPARATUS FOR MANAGING INTELLIGENT ASSETS IN A DISTRIBUTED ENVIRONMENT

BACKGROUND OF THE INVENTION

Monitoring the health of equipment in the field has been a complicated and inaccurate endeavor. Previous patents have covered simple mechanisms such as the existence of electrical power to the equipment and the electromechanical actions of physical sensors. None of these methods has provided a detailed view of the health of the equipment, only an external view of its connectivity and mechanical properties. For convenience, we use "asset" to describe any equipment, item or article an aspect of which can be monitored or controlled remotely.

A system for automatically monitoring a copier is known in the art from U.S. Pat. No. 4,583,834. This device monitors a number of copying machines utilizing a number of sensors placed on the copier for sensing various operating parameters such as the number of copies made by the machine, machine malfunctions and the amount of toner remaining in the machine. Signals representing these parameters are transmitted to a centralized processor. The count value is transferred to the central processor at predetermined intervals. One of the disadvantages of this system is that it requires a dedicated interface having a complex structure receiving input signals from a plurality of distinct sensors provided within each machine. It also fails to notify a user of specific information such as preventive maintenance and contract termination dates. This system is not suitable for installation in existing machines not expressly designed for the system.

A second photocopier system is known from U.S. Pat. No. 4,497,037 and includes a plurality of terminal devices provided at each copying machine and a central managing unit for managing the terminal devices. Each of the terminal devices receives input signals indicative of a plurality of user identifications of the copying machine and a second input signal indicative of utilization associated with each user at each copying machine. These data signals are stored and later transmitted to a central managing unit. The terminal receives a signal from the copying machine to which it is connected representing the number of copies made by the copying machine and which user made the copies. This information is transmitted to a central unit at a later date. One of the disadvantages of this system is that it does not monitor operating malfunctions of the copier or notify a service center when preventive maintenance is required.

Another monitoring system is known in the art from U.S. Pat. No. 5,077,582. This counter counts the number of papers processed by the copier producing a count signal. A monitoring system computer receives the count signal and increments a count value over a predetermined period. An interface circuit monitors the operation of the copier by monitoring the internal diagnostic signals of the copier as displayed on a photocopier display device associated with each copier. The interface circuit signals a central station when a malfunction of the copier has occurred, indicating the nature of the problem by translating the diagnostic signal and transmitting a translated diagnostic signal. A modem receives the accumulative count and diagnostic signals from the monitoring system computer and transmits each signal to the appropriate party at the central station.

The disadvantage of this prior art is its reliance on the mechanical counter interface and capturing the signals intended for the photocopier display device. In modern digital copy/print/fax/scan devices, commonly referred to as multi-function devices, these mechanical and display device interfaces are either non-existent or grossly inadequate to accurately capture performance and usage information from the device. The present invention overcomes this disadvantage by providing a direct digital interface through software, able to access device status, fault, usage, and log information that is not available mechanically.

Figure 1:
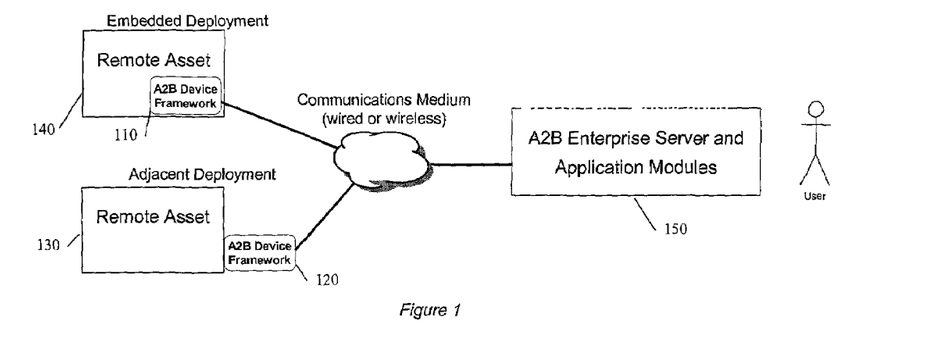
FIG. 1 is a block diagram showing the high-level conceptual architecture of a system in accordance with the invention.

As depicted in FIG. 1, the A2B software includes a Device Framework component [110 and 120] that can be connected through a digital interface to the device [Adjacent Deployment—130] or installed directly on the processor within the device to be monitored [Embedded Deployment—140]. A centralized Enterprise System [150] coordinates activities and provides user access to asset management applications. Communications between components occur through a variety of media, including wired Internet, dial-up telecommunications, and wireless.

Intelligent devices have grown in their own ability to self-diagnose and alert local users to fault situations through a control panel. In most cases, though, this information is only available to users or repair technicians physically at the location of the device. In U.S. Pat. No. 6,317,848, a system is described for recording data within the asset. Upon reaching a trigger point, an email is automatically sent to a number of email addresses containing a specially formatted data record of data that was previously recorded. The shortcomings of this approach include the limited flexibility in data retrieved, scheduling of transmissions, and reliance on email. The present invention allows for dynamic changes to the information retrieved, allowing greater or lesser visibility in to the functioning of the asset—saving data transmission costs when not necessary and providing additional detail when required. The current invention allows this to be configured from a centralized enterprise system and then directed to the specific asset without human interaction with that specific asset. In addition, the prior art established these parameters on the asset, requiring a physical presence at the asset to make changes. The current invention again allows a centralized enterprise system to control and update these parameters at any time.

For some recent computer-based equipment, remote computer control software has been used to allow the console of the equipment to be remotely located. This has progressed through the prior art from rudimentary text-based dialup terminal emulation to more sophisticated remote control systems that include the capability for graphics. Carbon Copy 32 from Compaq and LapLink from Traveling Software utilize "hooks" in the display subsystem of the remote computer to capture drawing requests and enabling a graphical user interface of the remote computer to be displayed at a user's local computer. PCAnywhere produced by Symantec of Cupertino, Calif. is an additional remote control program requiring server software on the remote computer in order to transfer graphics between computers of the same operating system. U.S. Pat. No. 5,732,212 discloses a system in which the video, keyboard and mouse ports of a remote computer are connected to a host unit and the video raster signal is converted to digital form. U.S. Pat. No. 6,304,895 discloses a system to provide control of a remote computer independent of the operating system by capturing the signals sent to and from peripheral devices such as the keyboard and display. In all of these previous cases, the intent of the invention was to allow a user to have access to a remote PC. The present invention does not require the presence of a user in order for monitoring information to be collected, transmitted, analyzed, and acted upon. It also does not require the remote access to be a personal computing device but instead has been designed to operate on a wide variety of specific operating systems, including Windows, Unix, and embedded real-time operating systems.

For computer to computer interaction that does not require a user to be present, the prior art includes the concept of a Remote Procedure Call (RPC) mechanism to communicate the invocation of server procedures. This approach worked well within the bounds of a business because the network communications were all trusted. To communicate with other businesses, or to communicate in any way across the public Internet, required a special security setup to create "holes" in the firewall protecting information systems. Most firewalls do permit HTTP traffic, the protocol used by browsers to retrieve web pages. This has given rise to a new model of RPC, known as Web Services. Based on text messages formatted with eXtensible Markup Language (XML), a new standard has emerged to package requests as messages. These standards, including WSDL (Web Service Description Language), SOAP (Simple Object Access Protocol), and XML, are gaining popularity for the interconnection of business systems—B2B (Business to Business) commerce—but have not been applied to the interconnection of individual intelligent assets.

BRIEF SUMMARY OF THE INVENTION

This invention provides a means of establishing a direct computer-based connection to remote equipment through Internet standard protocols. It provides both the underlying infrastructure for this interaction and the set of capabilities required to remotely monitor, control, diagnose, and manage remote equipment.

By taking advantage of the processing power within the remote equipment itself or an accompanying module, as minimal as it may be, we provide a direct link to the intelligence within the equipment. Access to equipment status, usage counts, diagnostic utilities, and other features are provided programmatically, as a system-to-system connection, unlike previous solutions that required a user to manually initiate action. This provides significantly more capability than simply allowing a local console user to be at a remote location.

Additional flexibility is provided through a mechanism for scheduling interactions between the asset and the centralized server. In cases where communications is impeded by wireless links or firewalls, an asynchronous messaging and polling mechanism is provided.

DETAILED DESCRIPTION OF THE INVENTION

The present invention solves a Distributed Asset Management (DAM) problem. Inexpensive and somewhat ubiquitous communications capabilities have created the environment whereby nearly any smart device, machine or piece of equipment, no matter how small or remote, can be hooked up and monitored. Today, assets as diverse as vending machines, leased tractors and oil-well pumps can be electronically monitored in a simple and cost-effective manner.

This invention provides both an infrastructure through which any device can interact with any enterprise system and it provides the solution for DAM.

The Distributed Asset Management space is, by its nature, heavily distributed. The enterprise and the assets being managed share in the responsibility of providing the required business logic. This invention not only provides the enterprise software to enable communication with a wide range of assets, but also provides robust support for the embedded systems residing in assets.

System Architecture

A fundamental aspect of A2B is the mechanism(s) used to communicate between assets and the A2B Enterprise Application. Key to this interaction is the ability to perform distributed communication across the Internet. The system-level architecture focuses on addressing the interaction between assets and the enterprise application.

Figure 2:
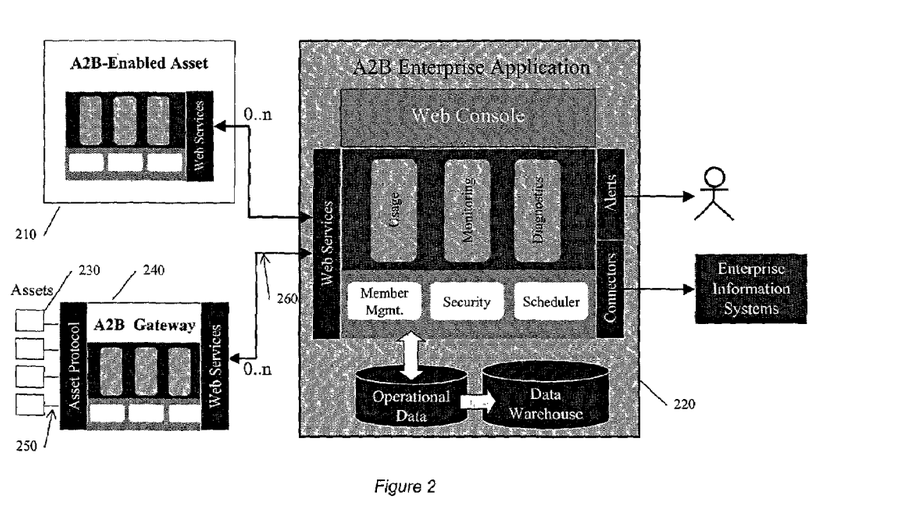
FIG. 2 is a block diagram showing the logical system architecture, including application modules.

FIG. 2 illustrates that an A2B-Enabled Asset [210] interacts with the A2B Enterprise Application 220. Web Services (based on SOAP/XML, URL encoding, WSDL, etc) provide for the required capability of doing distributed computing between these two components. Many assets can be natively enabled, via Questra's embedded platform, to communicate with the enterprise using A2B Web Services.

Alternately, assets [230] can connect to the enterprise by passing through an A2B Gateway 240. The A2B Gateway masquerades for a set of assets [230], translates addresses, and provides any necessary protocol conversions needed to "speak the native language of the enterprise" (i.e., Web Services).

The A2B Gateway 240 can be implemented on an embedded system, connected directly to the assets through asset protocols such as BACnet (Building Automation and Control network), Modbus, proprietary protocols, etc., or connected indirectly to the asset by connecting sensors, monitoring contact points, etc.

A2B Gateway software can be implemented on enterprise class computing systems when the need for horizontal scalability is required. Such gateways can be deployed inside of a corporation's firewall. For example, if the assets [230] use Simple Network Management Protocol (SNMP) on the internal network [250], the Gateway 240 can also provide an additional layer of security (e.g., SSL) for transmission across a less secure network [260] such as the Internet.

Figure 3:
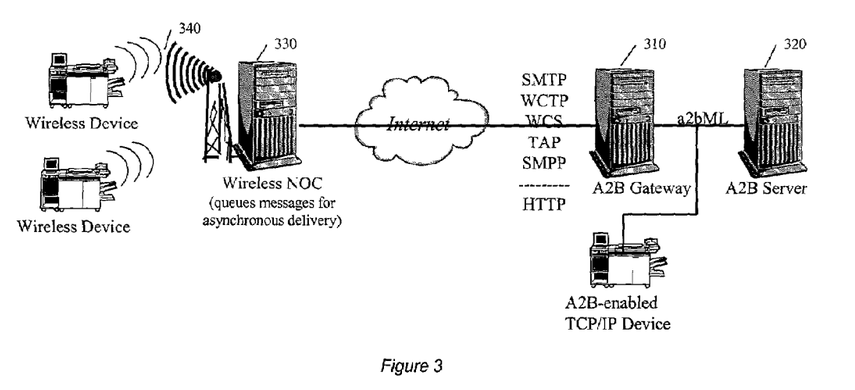
FIG. 3 is a diagrammatic illustration of an embodiment of the invention with a gateway.

Alternatively, FIG. 3 illustrates that the gateway software [310] can also be deployed to deal with asset communication and control networks that are either non-TCP/IP or using messaging other than a2bML such as a wireless provider [330]. This allows the centralized server [320] to remain insulated from the specifics of the protocol used on the remote network [340]. The Gateway provides any necessary address translation and protocol translation, similar to the capability to the gateway cited in FIG. 2, but it is located on the enterprise side of the wireless connection—typically located at the wireless NOC or the enterprise server site, adjacent to the centralized server [320]. Note that the actual software deployed to provide the gateway capability may be deployed on a separate machine, as shown in the diagram, or as a module on the centralized server.

Fields in the A2B headers are used for handling scenarios where intermediaries are involved in the path of a message from the originator to the final destination.

The following sections provide greater detail on the communication between assets and the enterprise, including discussion of Web Services, Gateways, and Application Modules.

A2bML

A Web Service is a software program that provides a business service and is accessible over the Internet. An architecture that is based on Web Services is the evolution from a system of distributed object-oriented components to a network of services, providing a loosely couple infrastructure that enable cross-enterprise integration.

The a2bML defines the message that the enterprise server software will operate on. The a2bML is an XML based meta-language the enables cross-platform data interchange using a standard method for encoding and formatting information related to A2B services.

The a2bML consists of both message header information used to process messages and a message body used to communicate the specifics of the message. The header typically includes information for security and routing of requests. Examples of objects and their methods included in the body of a message are: Registration (register device, register user), Security (logon, logoff), Remote Monitoring (submit current value, update schedule), Usage Metering (submit current reading, initialized meter), and so on. A2bML is represented by XML Schema and WSDL specifications. Each a2bML message includes a namespace URI specifying the version of the a2bML language.

SOAP Encoding

Figure 4:
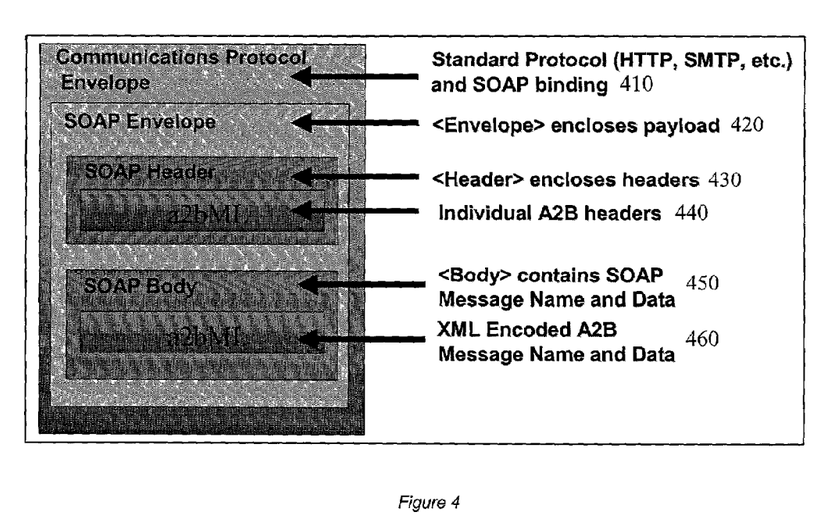
FIG. 4 is a detailed representation of the structure of a SOAP Encoded a2bML message.

A2B messaging leverages SOAP as an open and simple solution for invoking A2B services across the Internet. A standard A2B message is shown in FIG. 4 and consists of:
  (a) Outer Communication Protocol Envelope [410] (HTTP, MIME, SMTP, etc.)
  (b) Inner "communication protocol independent" SOAP Message Envelope 420 that serves as a container for the two main parts of the SOAP Message.
  (c) SOAP Header container [430] used to envelop one a2bML Header Document containing 0, 1, or several header elements 440.
  (d) SOAP Body container [450] used to envelop the a2bML document containing the message name and data. Specifically, the body contains 0, 1, or several A2B method names and associated parameters [460].

Note that by de-coupling the header information from the a2bML message body, modifications to the header will not impose on the A2B service developer. The body contains only the data/information for that specific A2B request message.

Figure 5A:
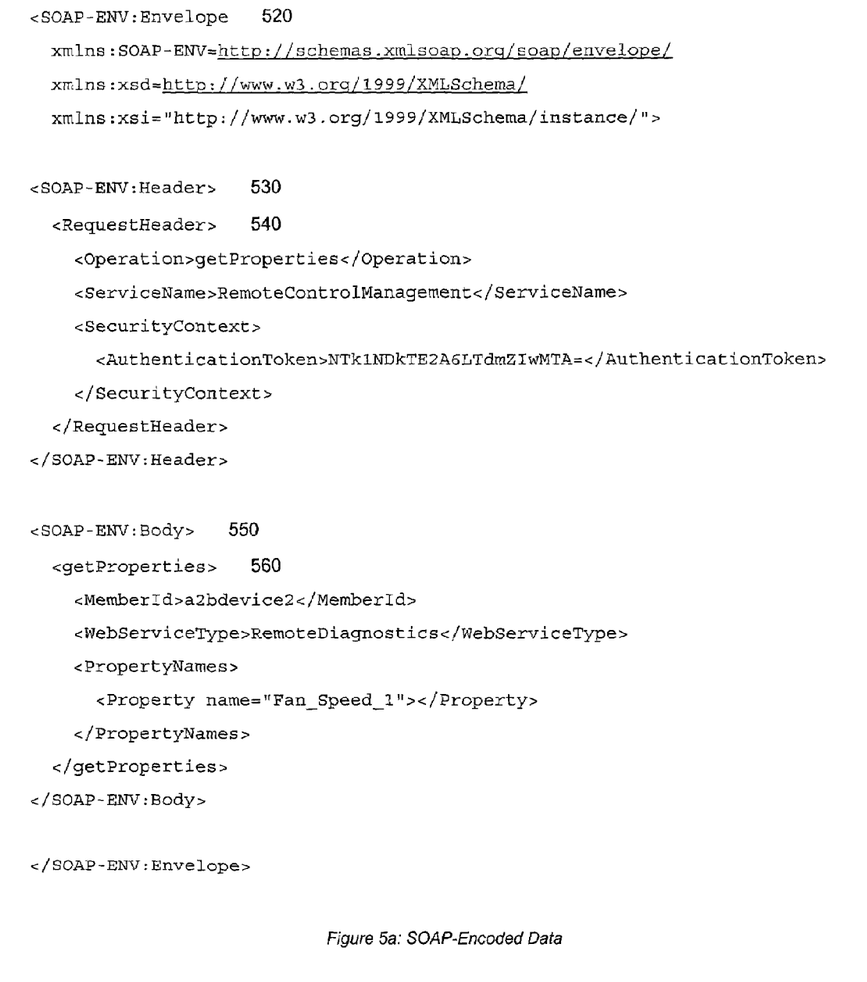
FIGS. 5a-c are listings showing an a2bML message in various forms.

FIG. 5a shows a sample of a SOAP-encoded message that would be transmitted over a standard communications protocol. The protocol envelope is not visible in this text, but the following elements described for FIG. 4 are apparent here:
  (a) Inner "communication protocol independent" SOAP Message Envelope [520].
  (b) SOAP Header container [530]
  (c) One a2bML Header Document [540].
  (d) SOAP Body container [550]
  (e) A2B method names and associated parameters [560].

URL Encoding

Figure 5B:
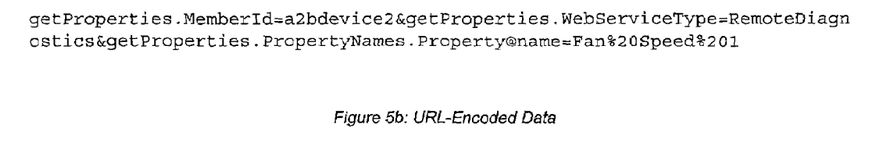

As an efficient alternative to SOAP encoding, this invention includes a means to encode the invocation of Web Services through HTTP's POST method. This overcomes situations in which SOAP is impractical, such as:
  (a) A device-side SOAP encoder is not technically viable due to the device platform's lack of resources
  (b) The message size of the SOAP message is prohibitive due to networking costs and limitations (SMS networks, for instance)
  (c) A political barrier to the use of SOAP technology cannot be overcome Complex, structured data can be sent via URL encoding by using a dot notation on the URL attribute names. FIG. 5b shows the URL encoded data of FIG. 5a. This mapping is accomplished through a combination of:
  (a) standard hex encoding of data, such as converting <space> to <% 20>
  (b) automatically rooting the body contents at the operation named in the header
  (c) indicating tag parameters with '@'
  (d) indicating tag nesting with '.'

Compact URL

Figure 5C:
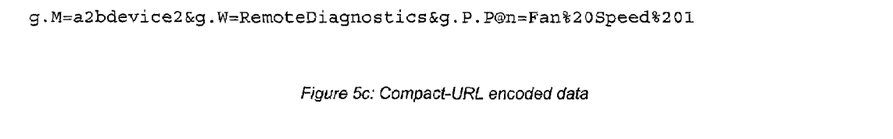

As a further means of economizing the message size, this invention covers a further encoding of the message data. This includes compression techniques and encoding techniques, such as abbreviating each tag with the minimal initial characters required to uniquely identify it. FIG. 5c provides an example of such an encoding scheme, though other algorithms could be applied.

Multi-Part Mime (Attachments)

An extension applicable to both SOAP and URL encoding is the use of multipart MIME (a main message with attachments). The attachments (when using MIME as part of an HTTP request) can include a binary encoded message.

Security

Many parties can access data transfer over the Internet, and sensitive date must be protected. The A2B request message header supports credentials for authentication and authorization, and includes an authentication token element obtained when a session is established. This token provides a means to authorize a particular client's invocation of the requested service.

SSL, digital signatures, and private key encryption are alternative implementations of security that can be applied to the message.

Firewalls, Dial-Up Connections and Non-Public IP Addresses

While many DAM services are initiated by the asset, there are also many cases where the enterprise is the initiator and the asset must provide a response. This invention accomplishes that by allowing the device to act as a server, accessible from the Enterprise Application via a Web Service proxy.

Figure 6:
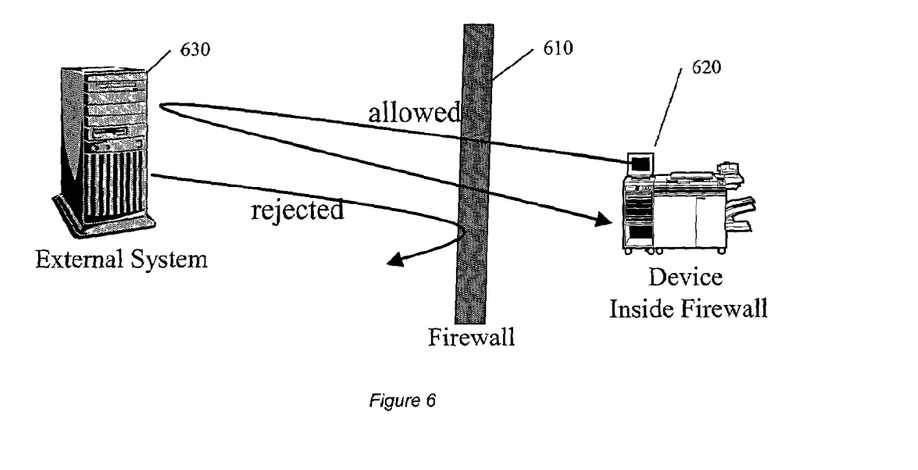
FIG. 6 is a diagrammatic view of an embodiment of the invention showing the typical action of a firewall to prohibit direct external access to internal resources.

This section outlines the strategies for supporting assets that need to receive unsolicited communications (typically from the centralized server). Among the challenges are:

(a) Firewalls—FIG. 6 illustrates the actions of most corporate firewalls [610] to allow client connections from elements inside the firewall [620] (think of your web browser), but to deny external connections to an entity inside the firewall by an entity on the outside [630]. Due to security considerations it is unlikely that a corporation will allow a "hole" in the firewall to be opened to allow connections to devices that are inside the corporate firewall. Therefore, this invention utilizes whichever port is open, typically port 80 for web traffic. Corporate proxy servers create similar issues.

(b) Dial-up Connections—Dial-up connections from a device elicit a similar problem as described above regarding firewalls. Typically, the only way to communicate with the device using dial-up is when the device initiates a connection with the server (regardless of standard firewall configurations).

(c) Non-public IP Addresses—Many assets are deployed with non-Public IP addresses (typically via a Network Address Translation (NAT) router, and in conjunction with a firewall). NAT routers are often not configured to create links from the Internet to any computer on the LAN. All assets behind such a router are hidden and inaccessible (i.e., not routable).

Polling Servers for Web Services

Figure 7:
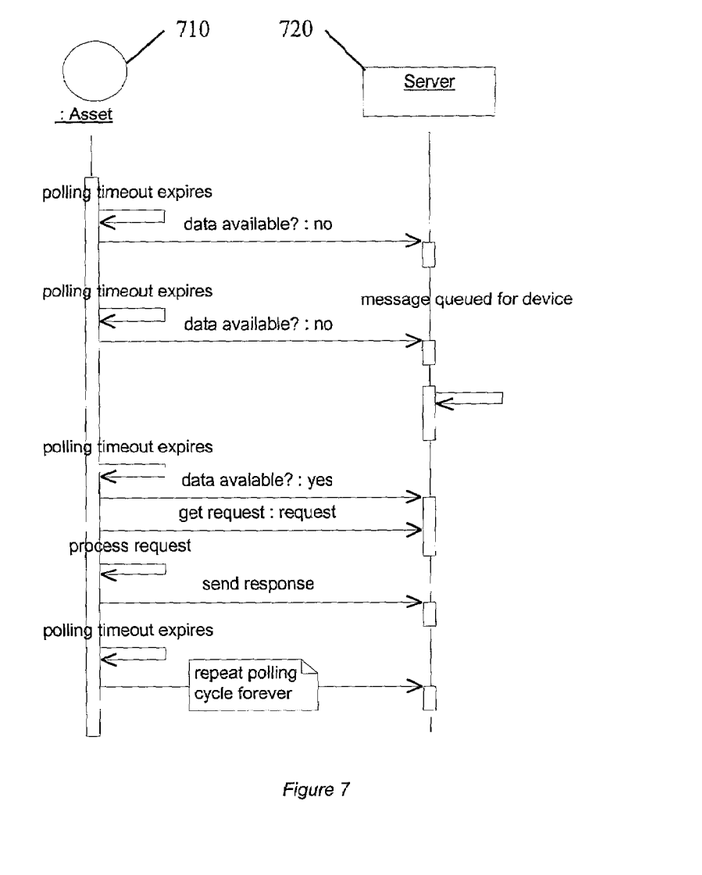
FIG. 7 is a diagram that illustrates the basic steps of a polling sequence to communicate Web Service requests through one-way filters such as a firewall.

A polling server gives an Internet client the ability to process unsolicited requests. In a polling server scenario, the client (usually the asset in an A2B system) periodically polls the server for any messages that are queued for the asset. This alleviates the problem presented by an unreachable IP addresses, but leads to a lack of responsiveness on the part of the asset as well as additional network traffic. FIG. 7 shows a polling server in action between an asset behind a firewall [710] and a centralized server [720].

This invention includes the application of polling servers to Web Services. Two separate messages are required to accomplish this through HTTP, which is an inherently request/response protocol. The first message is the request, which must be queued by the server for later deliver to the asset (we will assume the asset is unreachable through a firewall for this discussion, but that is only for purposes of the example). When the asset polls for messages, the first message is sent as the polling reply. Once the asset has completed the request and is ready to respond, such as with the current meter reading, the asset formats a second message to be sent to the server. Therefore, the response to this request for information from the asset is returned asynchronously and must be matched to the first message. This invention includes a tracking mechanism to log outgoing requests, reconcile incoming messages, and report timeout situations. This is preferably embodied in a database within the enterprise software, but could be tracked with other means.

Note that the amount of time between the message being queued for delivery to the device and the device processing the message is dependent on the polling interval on the device, leading to a degree of latency.

A slight improvement over the above sequence is for the asset to request a queued message rather than ask if any messages are available (of course, lack of a return message indicates that no messages are queued for the asset).

If the asset does receive a message, it should continue requesting messages until the server-side queue is exhausted. Note that a request for messages may return all messages that are queued.

An extension of this approach is to utilize a "keep-alive" connection to maintain an active communications path between asset and enterprise. This creates a channel through which real-time interaction can occur, such as Remote Diagnostics, from outside the corporate firewall.

Adaptive Polling

An optimization to the polling server adds the ability to speed up the polling interval due to situational conditions. Consider the following use case relating to remote diagnostics:

(a) Asset submits problem report (b) Technician is notified of the problem (c) Technician contacts the asset and performs remote diagnostics (either by querying asset properties, such as temperature and airflow, or by instructing the asset to execute internal diagnostics routines).

For example, an asset may be setup with a polling interval of once per day. If a problem is reported in the middle of the day and the technician desires to run a diagnostic test, the diagnostic command would wait in the polling queue until the end of the day when the asset polls again. Instead, this invention adapts the polling interval based on the situation. In this example, the fault notification causes the polling interval to shorten, perhaps to once per minute for 60 minutes. This allows the technician to have near real-time response to diagnostic requests for the expected duration of the diagnostic session.

The polling schedule change can be statically defined in the schedule for the asset (e.g. once per day; once per minute for 60 minutes upon fault) or dynamically changed based on the enterprise response (e.g. the fault message generates a reply from the enterprise server which contains an updated polling schedule such as once per minute for 20 minutes). Note that a possible scenario is that the polling server is inactive until a situation requires polling (a trade-off for operational costs).

Integrated Polling

What we call "integrated polling" is the ability for any communication from the asset to return information about queued data available for the asset. That is, every interaction with the enterprise is inherently a polling request. This represents an efficiency over the standard polling server in that communications from the asset that fall inside of a polling interval are sometimes more immediately available to the asset.

Note that the integrated polling server can be used either in conjunction with or in lieu of the standard polling server. A device that already has regularly scheduled communications with the server (e.g., heartbeats) can piggyback polling server capability. This makes it possible, for example, for a registration request from an asset to cause an update to the asset schedule—that is, an asset-initiated interaction can still cause an enterprise-initiated request to be processed.

Inquiry or Poll

The delivery of the queued message from the server to the asset may occur in a two-step process. The polling inquiry (an explicit poll or an integrated polling message) may cause the server to indicate in the response that a message is queued for that asset. This may be implemented as a flag in the response header or in other ways, to indicate that a request for a pending message should be initiated by the asset. A further optimization on this solution is for the actual request that is queued for the asset to be returned as part of the asset-initiated communication.

Internet Proxies

Figure 8:
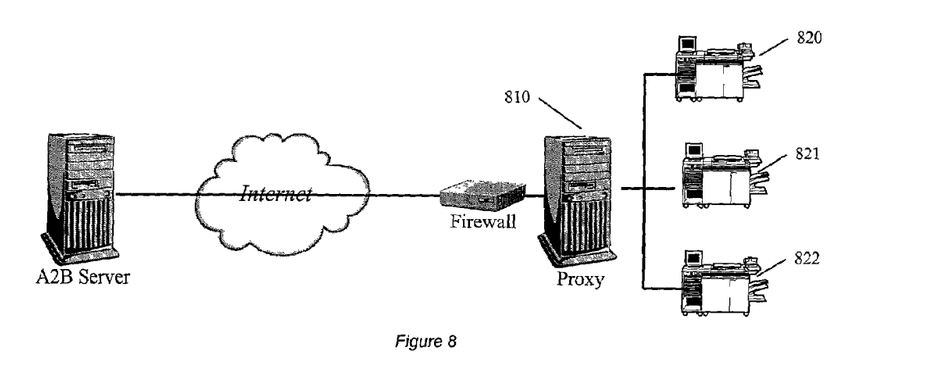
FIG. 8 is a diagrammatic view of an embodiment of the invention that includes a Proxy server.

An alternative to the polling server in the case of firewalls (although not applicable for dial-up connections and non-public IP addresses) is the use of a proxy deployed at the corporation housing the asset(s). This is depicted as the "Gateway" in FIG. 2. FIG. 8 provides a more focused view of the proxy [810] that manages all communications with assets behind the firewall [820, 821, 822]. This single point of contact allows communications to be closely monitored, and provides for additional on-site management of deployed assets.

The instance where the proxy is most desirable is in the case of a retrofit scenario, interfacing with an SNMP system for instance, where multiple devices are accessible on a LAN or with factory automation assets available over a serial connection. The proxy can also provide filtering and additional security, such as not forwarding patient-identifiable information that flows among medical devices on a Laboratory Information Management System.

Supporting SSL on the gateway is an attractive strategy in the proxy scenario given security concerns and the horsepower of the proxy. This added security allows fully encrypted communications over the Internet, while allowing standard sockets-based communications inside the firewall.

Dealing with Alternate Communication Mechanisms

Inherently Asynchronous Networks

Figure 9:
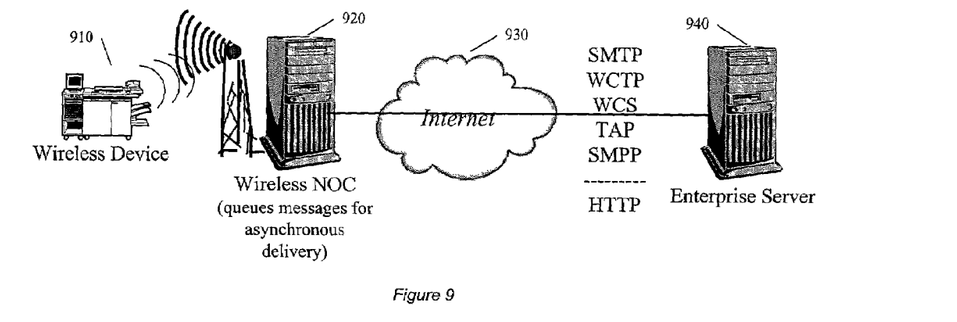
FIG. 9 is a diagrammatic view of a Wireless embodiment of the invention.

Some networks are inherently asynchronous—as used herein, asynchronous means a network connection in which either end can open a connection, but neither can keep it open. Certain two-way paging wireless networks (Reflex, for instance) provide examples of such networks. FIG. 9 depicts a representative system in which requests meant for the end device [910] are sent to a wireless Network Operations Center (NOC) 920, where they are queued for delivery. Any response to the request is delivered asynchronously from the asset [910] via the NOC 920 to the server [940] via the Internet [930].

Requiring support for these types of networks requires the ability on the Enterprise to correlate requests and responses, as well as manage timeouts and status queries of responses. It also demands that any asset that handles incoming requests where a response is required must be able to send the response asynchronously.

Note that this same requirement is present when implementing a polling server, where the asset receives a request via polling and so must respond asynchronously.

Active and Passive Communication

A critical capability is the ability to schedule communications with the device. There are basically two types of scheduled communications:

(1) Active—The server initiates communication with the asset, pulling information from it. Note that the returned information can be returned synchronously (the most desirable in terms of performance and network traffic) or asynchronously (necessary to support certain networks, as described above, or to support communications that are inherently asynchronous, such as the scheduling of a long duration remote diagnostics routine).

(2) Passive—The asset maintains the schedule, and pushes information to the server based on that schedule or conditions within the asset. This is particularly useful when the asset is behind a firewall and can only initiate actions, but also may use a means such as the polling server discussed earlier to provide updates to the schedule.

Application Modules

The Application Module (AM) is fundamental to the architecture of the A2B Application. Application Modules implement A2B business logic on both the enterprise and on the asset, as well as handle the Web Service interface between assets and the enterprise.

The Enterprise Architecture

Figure 10:
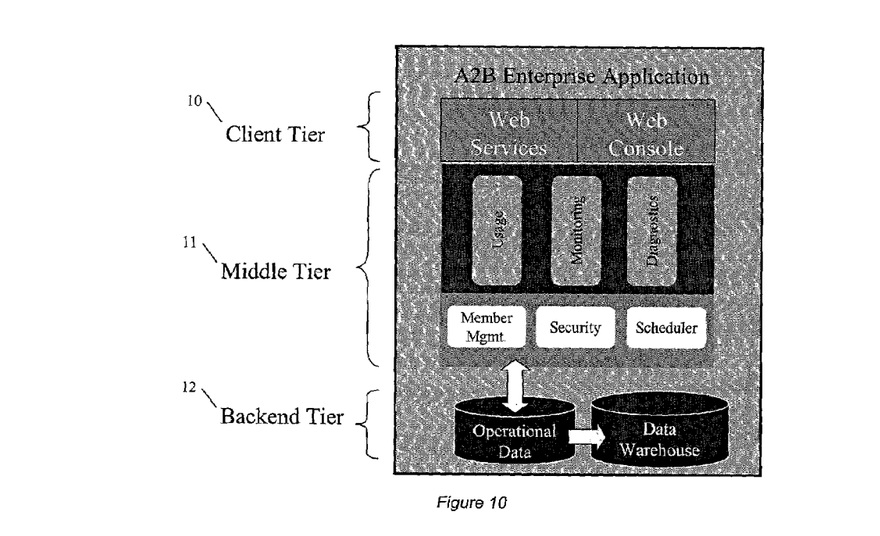
FIG. 10 is a block diagram that illustrates the tiers of an application server in accordance with the invention.

The invention utilizes a multi-tier distributed application software model. This consists of a client tier, a middle tier, and a backend tier. FIG. 10 illustrates this tiered architecture as follows.

The client tier [10] supports a variety of client types, both outside and inside of corporate firewalls. Typically, communication occurs across the Internet, whether from assets or human users, via the client tier, including for example: users with web browsers; assets with components of this invention; and external applications using a Web Services integration model.

The middle tier [11] contains the application logic that that provides the services requested by the client tier. Preferably, this is implemented with Enterprise JavaBeans (EJB) software components. Other software component models may be used as an alternative to EJBs.

The backend tier [12] supports access to existing information systems by means of standard APIs. A typical use is for access to a relational database.

Runtime Environment

Figure 11:
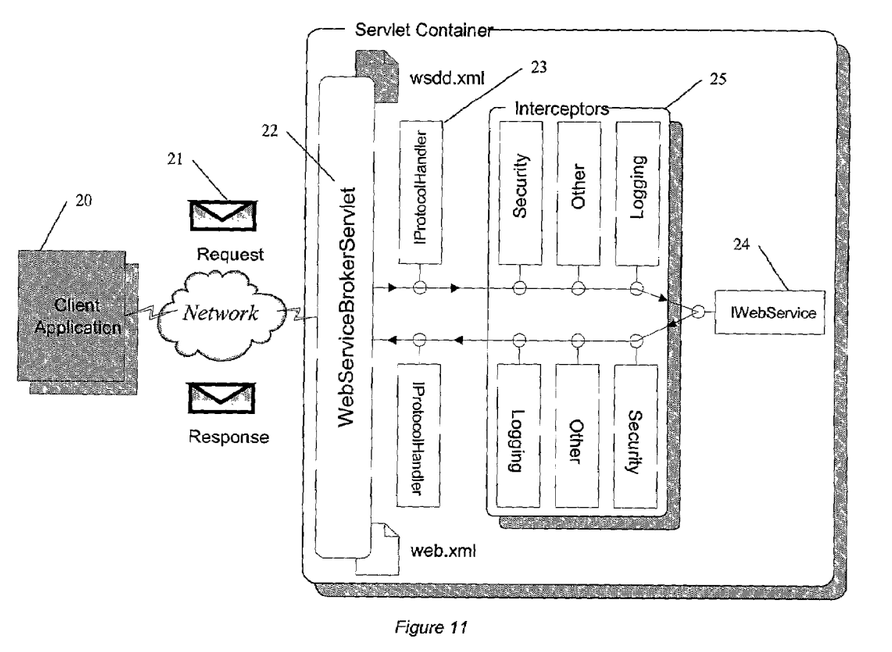
FIG. 11 is a block diagram view in to the software components within a centralized server.

The invention also incorporates a Web Services runtime environment, as depicted in FIG. [11].

A client application 20 that wishes to use the functionality of an A2B Service creates a request message [21] that is sent over the network to a predefined Uniform Resource Locator (URL). The A2B Web Service broker 22 is associated with the URL and handles incoming requests.

When a request is received the protocol handler [23] is responsible for parsing the incoming data stream and constructing the appropriate message object for the protocol that is being used by the client. From the message, the destination Web Service is determined based on the contents of the SOAP message (see FIG. 4 for an example). The Web Service Registry is queried to find the class name that provides the implementation of the service 24. The default implementation of the Registry uses an XML based document named wsdd.xml (WSDD stands for "Web Services Deployment Descriptor") that contains the mapping between a Web Service and the implementation class name. Other application server environments may use a different means of mapping a Web Service to implementation software. The runtime will create a new instance of the service object, if it is not available in the cache of instantiated web services, and forward the message to the service for processing.

The invention also employs a custom-built Web Service Interceptor model [25] that can be configured to provide add-on services to support such things as logging and security transparent to a Web Service. Interceptors are invoked by the runtime both before and after a message is consumed, and can be configured either globally or on a per-service basis. This allows the software providing the service to be independent of how a particular implementation chooses to do security and logging.

Security is provided both through credentials (such as a UserID and Password) and through authentication token. The authentication token is generated upon a successful login and can then be used in subsequent transactions to reduce the security overhead. Other approaches to security are also covered, including digital certificates, private key pairs, and public/private keys.

Embedded Architecture

While the enterprise software for A2B provides full standalone application functionality, the embedded software strives to provide useful infrastructure for assets that communicate with the A2B enterprise application. This is because the main purpose of the asset collaborating in an A2B system is not typically A2B (a network printer's main purpose, for instance, is to make prints, not to provide remote diagnostics). Even embedded A2B gateways tend to be specific to the assets monitored (and/or the asset's native networks and protocols).

Providing a useful solution relevant for embedded systems is complicated by the heterogeneous nature of assets, with wide variability in the following areas:
  (a) Operating systems: There are dozens of commercial operating systems available, including VxWorks, embedded Linux, Nucleus, OS/9, EPOC, Windows CE, custom (homegrown) RTOSes, and many more.
  (b) Resource availability: RAM/ROM constraints, power considerations, availability of non-volatile storage, etc. vary widely.
  (c) Processing capability: ranging from 8-bit microcontrollers to [32]-bit microprocessors with Memory Management Units.
  (d) User input capability: ranging from reduced to none.
  (e) Connectivity options: potentially limited bandwidth (with varying pricing models). Ranging from tethered, untethered, dial-up, and full wireless.
  (f) Programming language availability: Java, C++, and C.
  (g) Existing software base: existing web servers, XML parsers, and SNMP agents.

Because of these issues, the embedded software needs to be highly configurable as to which pieces of the solution are applicable to a given asset. Sometime we will only be able to provide very basic building blocks for A2B connectivity. In other cases (i.e., higher-end assets) we will be able to deliver robust application level support at both the Web Services layer and in application module functionality described as a microServer.

Framework vs. SDK

The distinction between an SDK (a.k.a. "toolbox") and a framework is important because a framework provides more capabilities to the programmer. The A2B Device Framework not only provides a set of routines that provide functionality, but also provides the orchestration of those functions to solve a bigger problem.

A programmer can quickly use a handful of the SDK functions to create a "do something" application. To make that application solve a more complicated problem, though, the programmer spends much more time and requires understanding of a huge number of these API calls, and a bunch of code to actually call them. The framework has already solved many of these aspects of Web Service applications and supports a framework and philosophy for developing new applications. Specifically, the application-independent portion of the problem is solved in the framework, and need not be solved again.

A logical and convenient way to provide a framework is through an object oriented software design and implementation, using inheritance.

An example of this breakdown is the A2B protocol stack. The abstraction of a protocol stack is represented in C++, and provides a highly flexible mechanism for building, configuring, and using a protocol stack. The "guts" of the layers are written in C. The HTTP layer of the protocol stack is represented by a C++ class that adheres to the A2B protocol model, and is implemented using a library of C calls relying on "buffer-in" and "buffer-out". These C calls can then be optimized and used by an asset relying solely on the SDK.

ANSI C and C++ have been chosen as the implementation language for A2B embedded systems support. Developing an object-oriented framework can be done more easily in C++ than in C, and elements of the framework that lean more toward "framework" than "SDK" are accomplished using C++. The C++ framework relies on a "toolbox" of code written in C. This C code can than be used in assets that do not support C++ (e.g. most 8-bit microcontroller-based assets).

The invention claimed is:

1. A method of communicating between a server and an asset comprising the steps of:
  queuing one or more request messages in a queue on the server;
  logging the one or more request messages on the server;
  detecting a fault at the asset requiring interactivity;
  in response to the fault, sending one or more polling messages from the asset to the server;
  sending one of the one or more request messages to the asset in response to the one or more polling messages;
  sending a responsive message from the asset to the server, the responsive message corresponding to said one of the request messages that has been sent to the asset;
  receiving the responsive message at the server and reconciling the responsive message with the corresponding one of the request messages; and
  continuing to send request messages to the asset until the queue is empty.

2. The method of claim 1 in which the step of sending one or more polling messages comprises sending the one or more polling messages at an interval shorter than a predetermined interval at which the asset sends periodic polling messages to the server.

3. The method of claim 2 in which the predetermined interval is set by the server.

4. The method of claim 1 in which the server is configured to send one or more of the request messages to the asset in response to any message from the asset received by the server.

5. The method of claim 1 in which said one of the one or more request messages includes a request for establishing an interactive session and the responsive message from the asset establishes an open connection through which subsequent messages are sent.

6. The method of claim 1 in which the asset comprises a gateway device that provides protocol or address translation to other assets.

7. The method of claim 6 in which the gateway device maintains a schedule and interacts with the other assets as required to satisfy the schedule.

8. In a server that operates in a network that includes remote assets, a method of communicating between the server and a remote asset, comprising:
- queuing one or more request messages in a queue on the server;
- logging the one or more request messages on the server;
- receiving a polling message from the remote asset, the polling message having been sent by the remote asset in response to detection of a fault at the remote asset that requires interactivity with the server;
- sending one of the one or more request messages to the remote asset in response to the polling message;
- receiving a responsive message from the remote asset and reconciling the responsive message with said one of the one or more request messages that has been sent to the remote asset; and
- continuing to send request messages to the remote asset until the queue is empty.

9. The method of claim 8 in which the server is configured to send one or more of the request messages to the remote asset in response to any message received by the server from the remote asset.

10. The method of claim 8 in which said one of the one or more request messages includes a request for establishing an interactive session with the remote asset and the responsive message establishes an open connection through which subsequent messages are sent.

11. The method of claim 8 in which the remote asset comprises a gateway device that provides protocol or address translation to other remote assets of the network.

12. The method of claim 11 in which the gateway device maintains a schedule and interacts with the other remote assets as required to satisfy the schedule.

13. In an asset that operates in a network that includes other assets and a remote server, a method of communicating between the asset and the remote server, comprising:
- sending a polling message to the remote server, the polling message having been sent by the asset in response to detection of a fault at the asset that requires interactivity with the remote server;
- receiving a request message from the remote server in response to the remote server having received the polling message, the request message being one of one or more request messages that have been:
  - queued in a queue on the remote server; and
  - logged on the remote server;
- sending a responsive message to the remote server, such that the remote server can reconcile the responsive message with the request message that has been received by the asset; and
- continuing to receive request messages from the remote server until the queue is empty.

14. The method of claim 13 in which the remote server is configured to send one or more of the request messages to the asset in response to any message received by the remote server from the asset.

15. The method of claim 13 in which the request message received from the remote server in response to the remote server having received the polling message includes a request for establishing an interactive session with the asset and the responsive message establishes an open connection through which subsequent messages are sent.

16. The method of claim 13 in which the asset comprises a gateway device that provides protocol or address translation to other assets of the network.

17. The method of claim 16 in which the gateway device maintains a schedule and interacts with the other assets as required to satisfy the schedule.

18. In a server that operates in a network that includes remote assets, a method of communicating between the server and a remote asset, comprising:
- queuing one or more request messages in a queue on the server;
- logging the one or more request messages on the server;
- receiving a polling message from the remote asset,
- sending one of the one or more request messages to the remote asset in response to the polling message, said one of the one or more request messages including a request for establishing an interactive session with the remote asset;
- receiving a responsive message from the remote asset, the responsive message establishing an open connection through which subsequent messages are sent;
- reconciling the responsive message with said one of the one or more request messages that has been sent to the remote asset; and
- continuing to send request messages to the remote asset until the queue is empty.

19. The method of claim 18 wherein the received polling message is one of a plurality of polling messages that are sent to the server from the remote asset at a predetermined interval.

20. The method of claim 18 wherein polling message has been sent by the remote asset in response to detection of a fault at the remote asset that requires interactivity with the server.

21. The method of claim 18 in which the remote asset comprises a gateway device that provides protocol or address translation to other remote assets of the network.

22. The method of claim 21 in which the gateway device maintains a schedule and interacts with the other remote assets as required to satisfy the schedule.

23. In an asset that operates in a network that includes other assets and a remote server, a method of communicating between the asset and the remote server, comprising:
- sending a polling message to the remote server;
- receiving a request message from the remote server in response to the remote server having received the polling message, the request message including a request for establishing an interactive session with the asset, the request message being one of one or more request messages that have been:
  - queued in a queue on the remote server; and
  - logged on the remote server;
- sending a responsive message to the remote server, such that the remote server can reconcile the responsive message with the request message that has been received by the asset, the responsive message establishing an open connection through which subsequent messages are sent; and
- continuing to receive request messages from the remote server until the queue is empty.

24. The method of claim 23 wherein sending the polling message is performed by sending the polling message as one of a plurality of polling messages that are sent to the remote server at a predetermined interval.

25. The method of claim 23 wherein sending the polling message is performed in response to detecting a fault at the asset that requires interactivity with the remote server.

26. The method of claim 23 in which the asset comprises a gateway device that provides protocol or address translation to other assets of the network.

27. The method of claim 26 in which the gateway device maintains a schedule and interacts with the other assets as required to satisfy the schedule.

* * * * *